United States Patent

Hoffman

[15] 3,648,065

[45] Mar. 7, 1972

[54] STORAGE CIRCUIT FOR SHIFT REGISTER

[72] Inventor: William K. Hoffman, Shelburne, Vt.

[73] Assignee: International Business Machines Corporation, Armonk, N.Y.

[22] Filed: Jan. 28, 1970

[21] Appl. No.: 6,496

[52] U.S. Cl. ..........................307/221 C, 307/238, 307/251, 307/279

[51] Int. Cl. ..........................G11c 19/00

[58] Field of Search ..........................307/221 C, 251, 279, 238

[56] References Cited

UNITED STATES PATENTS

| | | | |
|---|---|---|---|
| 3,252,009 | 5/1966 | Weimer | 307/221 C |
| 3,322,974 | 5/1967 | Ahrons et al. | 307/221 C |
| 3,524,077 | 8/1970 | Kaufman | 307/221 C |
| 3,518,451 | 6/1970 | Booher | 307/251 |

OTHER PUBLICATIONS

Application Notes of General Instrument Corp., Dec. 1967, by Sidorsky, pp. 1– 5

*Primary Examiner*—John S. Heyman
*Attorney*—Hanifin and Jancin and Willis E. Higgins

[57] ABSTRACT

A shift register storage circuit is provided with first storage means connected to the gate of a first field effect transistor (FET) in which a pulse for another storage means of a subsequent storage circuit is supplied through the same FET independent of the state of the first storage means. In an embodiment, this is accomplished by connecting a source of the pulses to a current flow electrode of the first FET, and connecting this current flow electrode through a capacitor to the gate electrode of the first FET. A second FET serves as an isolating switch between the first FET and the storage means of a subsequent storage circuit. In this arrangement, the pulses may be applied through the first FET independently of the state of the data input at the gate of the FET and without altering the data input.

18 Claims, 9 Drawing Figures

INVENTOR
WILLIAM K. HOFFMAN

BY Willis E. Higgins

ATTORNEY

STORAGE CIRCUIT FOR SHIFT REGISTER

Field of the Invention

This invention relates to solid-state shift registers. More particularly, it relates to an integrated circuit FET shift register of simplified construction which may be made smaller than conventional FET shift registers, and which is therefore particularly suited for large capacity memory applications.

An FET shift register storage circuit may utilize two series connected FET's, with a capacitor between the gate electrode of the second FET and a node between the two FET's. This approach reduces the number of circuit elements required in each storage circuit of the shift register to two active devices and one capacitor. While this approach represents a substantial advance in the FET shift register art a relatively large capacitance value is required at voltage levels that can be employed with FET-integrated circuits to assure that information may be shifted from one storage circuit to another before it is lost. For this reason, each storage circuit in such a shift register is relatively large, even though it contains only three circuit elements.

Description of the Prior Art

Commonly assigned A. S. Farber et al., U.S. Pat. No. 3,461,312 discloses an FET shift register circuit in which capacitance values need not be as large as with a capacitor between two series connected FET's. However, the circuits there disclosed, while they can be made smaller than the capacitor between two series connected FET's arrangement, require a total of at least three FET's per storage circuit of the shift register, as opposed to two in the arrangement of a capacitor between two series connected FET's.

SUMMARY OF THE INVENTION

Accordingly, it is an object of the invention to provide an integrated circuit shift register with both a minimum number of active elements in its storage cell and a smaller size storage cell.

It is another object of the invention to provide a field effect transistor shift register in which a storage means is connected to the gate of a field effect transistor and a pulse is applied through the same field effect transistor independent of the information in the storage means.

It is a further object of the invention to provide an FET shift register with capacitive storage means connected to the gate of a field effect transistor and in which a pulse is supplied through the same field effect transistor, independent of the information stored on the capacitive storage means, for a capacitive storage means of a subsequent storage circuit.

It is still another object of the invention to provide an FET shift register in which a storage circuit of the register contains only two FET's, and which has a smaller cell size than FET shift registers containing more FET's per storage circuit.

The attainment of these and related objects is realized through the present invention, which is based on the discovery that pulses may be applied through an FET, the gate of which is connected to a storage means, independent of the state of the storage means. In addition to this FET, each storage circuit of the register includes a second FET operating as a switch between the first FET and a storage means of a subsequent storage circuit in the register.

In accordance with the invention, there is provided a circuit comprising first and second FET's, each having two current flow electrodes and a gate electrode, the two FET's being connected with their current flow electrodes in series. A storage means, preferably capacitive in nature, is connected to the gate electrode of the first transistor. A data input is connected to the storage means. Means is provided for supplying a pulse through the first FET independent of the state of the storage means. A means utilizing energy from the pulse, usually a storage means of another storage circuit, is connected to the current flow electrode of the second FET remote from the first FET. A source of clocking pulses is coupled to turn on the second FET, which serves to isolate the first FET and the means utilizing energy from the pulse in the absence of a clocking pulse.

Applying pulses through the first FET, which also has data input to its gate, means that one FET can be utilized for these two functions, which require two FET's in conventional shift registers. Elimination of a separate FET for one of these functions may be accomplished without a corresponding increase in cell area for passive components, due to the manner in which the cell may be operated.

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
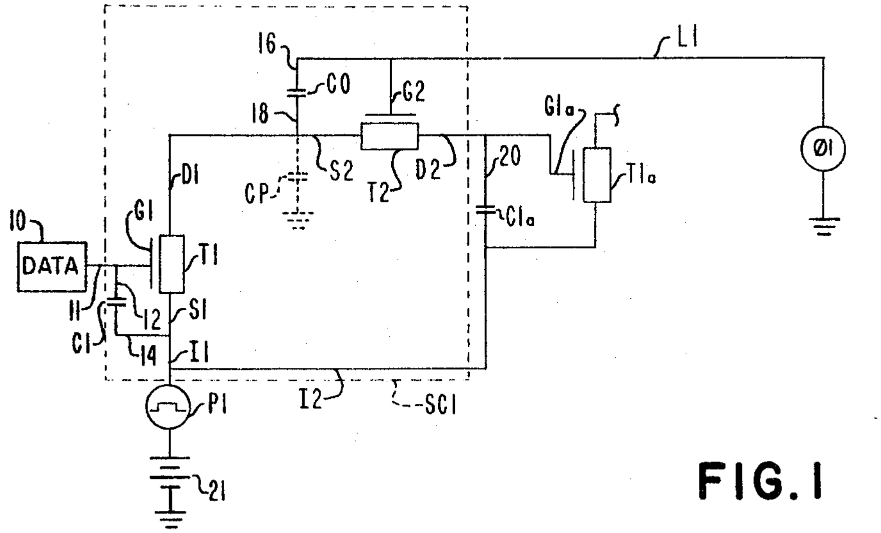
FIG. 1 is a schematic diagram of a circuit in accordance with the invention forming a single storage circuit of a shift register.

Turning now to the drawings, more particularly to FIG. 1, there is shown a single shift register storage circuit SC1 in accordance with the invention. In the following discussion, all FET's are assumed to be of the N-channel type. P-channel FET's may be employed, in which case the positive polarity of signals supplied to the gates of the FET's in the following discussion must be reversed. It is further assumed that the storage circuit is operated with a negative substrate bias so that the FET's operate in the enhancement mode. FET's T1 having current flow electrodes S1 and D1 and T2 having current flow electrodes S2 and D2 are series connected by their current flow electrodes D1 and S2. DAta source 10 is connected to gate G1 of FET T1 by line 11. Electrode 12 of storage capacitor C1 is also connected to gate G1. The other electrode 14 of storage capacitor C1 is connected to current flow electrode S1 of FET T1.

Source P1, connected by line I1 to current flow electrode S1 of FET T1 and to electrode 14 of storage capacitor C1, supplies pulses through FET T1 independent of the charge on storage capacitor C1. To allow pulses from source P1 to be transmitted through FET T1 when there is no charge on storage capacitor C1, a pulse from source P1 serves to turn on FET T1 by capacitive coupling to gate G1 through capacitor C1. Data supplied from data source 10 can be considered a DC-voltage in the case of a "1" and the absence of the DC-voltage in the case of a "0", when compared to the duration of pulses from source P1. Therefore, the transmission of the pulse from source P1 through C1 to gate G1 of FET T1 does note affect the data. FET T2 is turned on by the application of a pulse from source $\phi 1$, connected to its gate G2 by line L1.

Capacitor C0, having one electrode 16 connected to gate G2 of FET T2 and its other electrode 18 connected to current flow electrode S2 of FET T2, is used for the temporary storage of the energy from source P1 until the pulse from source $\phi 1$ turns on FET T2 to allow transmittal of the energy from source P1 to storage capacitor C1*a* of a subsequent storage circuit, connected by its electrode 20 to current flow electrode D2 of FET T2. A modified form of the invention, in which the pulse from source P1 to be supplied to storage capacitor C1a and the pulse from source $\phi 1$ overlap, thus allowing capacitor C0 to be eliminated, is the subject matter of a commonly assigned application by William K. Hoffman and John W. Sumilas, entitled "Modified Storage Circuit for Shift Register," filed on the same day as the present application.

DC source 21 is for the purpose of applying a bias level to storage capacitors C1 and C1*a* in FIG. 1, and to other corresponding capacitors in the shift register. This DC-bias reduces the required size of capacitor C0 in relation to parasitic capacitance C*p* and capacitor C1*a*, by preventing current flow in the reverse direction from electrode D2 to electrode S2 of FET T2 at the termination of a pulse from source $\phi 1$, because the bias assures that the threshold voltage level between electrodes D2 and G2 of FET T2 for reverse current flow is not obtained.

When the pulse from source $\phi 1$ turns on FET T2, the charge on capacitor C0 supplied by source P1 is transmitted to storage capacitor C1a of the subsequent storage circuit, if the data supplied by data source 10 and stored on capacitor C1 is a "0", i.e., no data charge is present at gate G1 of FET T1. Additional charge to storage capacitor C1a is also applied by the pulse from source $\phi 1$, through capacitor C0. The presence of energy supplied by the pulse from source P1 on capacitor C0 prior to application of the pulse from source $\phi 1$ means that the value of capacitor C0 may be reduced sufficiently to give a cell size of about four square mils when a shift register is laid out as in FIGS. 4A and 4B, which will be explained in detail below. If a positive signal is being applied to gate G1 of FET T1 from data source 10, indicating a "1," a path to ground through FET T2, FET T1, source P1, and source 21 is provided to discharge any preexisting charge on storage capacitor C1 *a* and the charge resulting from the pulse from source P1 temporarily stored on capacitor C0. The data from data source 10 is therefore stored in inverted form on storage capacitor C1*a* by operation of the circuit. Within a shift register, the source 10 of data actually comprises a circuit identical to that shown. In fact, the circuit as described above constitutes a source of data to FET T1*a*, which is a portion of a subsequent data storage circuit. The operation of the circuit shown in FIG. 1 is explained in further detail in a copending application by William K. Hoffman, entitled "Field Effect Transistor Circuit," filed on the same day as the present application, the disclosure of which is incorporated by reference herein.

Figure 2:
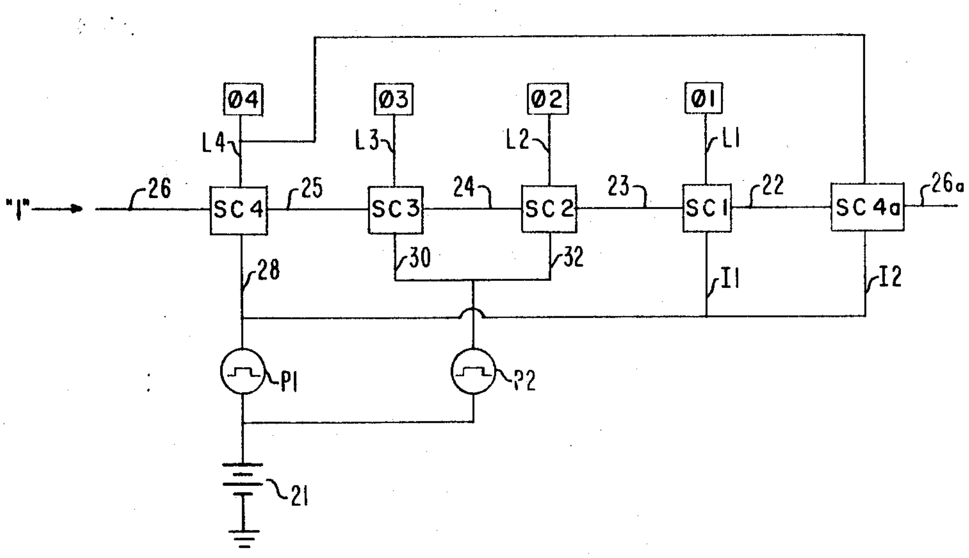
FIG. 2 is a block diagram showing a portion of a shift register composed of a plurality of the circuits in FIG. 1.
Figure 3:
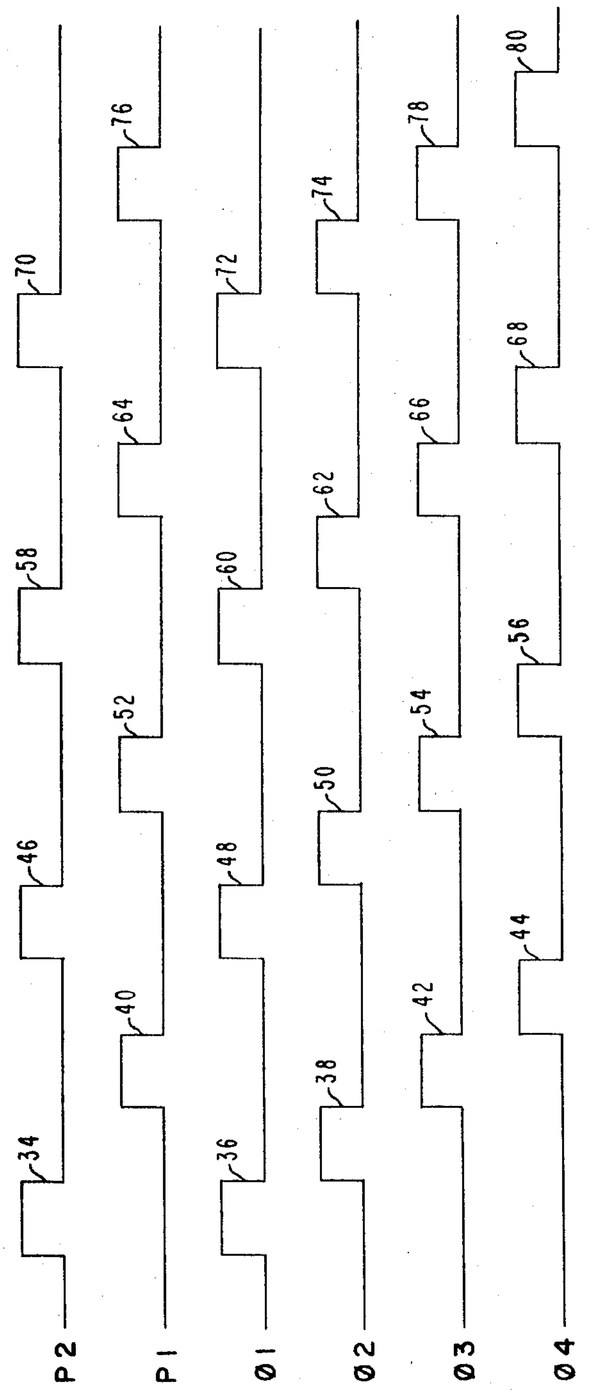
FIG. 3 illustrates a set of pulses used to propagate data through the portion of the shift register in FIG. 2.

FIGS. 2 and 3 show the operation of storage circuits as shown in FIG. 1 in more detail in a shift register, by depicting the pulses necessary to shift a data "1" from storage circuit SC4 through SC3, SC2 and SC1 to storage circuit SC4a in FIG. 2. SC1 and each of the other storage circuits SC4, SC3, SC2, and SC4*a* in FIG. 2 contain corresponding circuitry to that labeled as SC1 in FIG. 1. In the following explanation, it will be assumed that there is other data present in the portion of the shift register shown, due to previous operation in the manner explained below, but the movement of this other data will not be followed in detail. The storage circuits SC4 to SC4*a* are arranged for operations with staggered clocking pulses, from clocking pulse sources $\phi 4$, $\phi 3$, $\phi 2$, and $\phi 1$ connected to each of the storage circuits by lines L4, L3, L2 and L1, respectively. Interconnections 22, 23, 24, 25, 26 and 26*a* connect the second FET of a storage circuit located to the left of the interconnection to the storage capacitor of a storage circuit at the right of the interconnection. For example, interconnection 22 connects FET T2 of storage circuit SC1 and storage capacitor C1*a* of storage circuit SC4*a*. It can therefore also be seen that storage circuit SC2 of FIG. 2 performs the function of the data source 10 in FIG. 1 for storage circuit SC1.

Pulse source P1 is connected to storage circuits SC4, SC1, and SC4*a* by lines 28, l1, and l2, respectively. Pulse source P2 is connected to storage circuits SC3 and SC2 by lines 30 and 32, respectively. In a complete shift register, the storage circuits are connected to pulse sources P1 and P2 in alternating groups of two.

The pulse program of FIG. 3 begins with a pulse 34 from source P2 and a clocking pulse 36 from clocking pulse source $\phi 1$, shown as simultaneous for convenience and to save time in shifting operations. The pulse 34 is for the purpose of supplying energy to storage capacitor C1 of storage circuit SC1 through storage circuit SC2 in the manner described above and for supplying energy to the corresponding storage capacitor in storage circuit SC2 through storage circuit SC3 as well. At the termination of pulse 34, a charge from it is temporarily stored on capacitors in storage circuits SC2 and SC3 corresponding to capacitor C0 in storage circuit SC1. The clocking pulse 36 creates a vacancy in storage circuit SC1 by transferring in inverted form any information stored on its storage capacitor C1 to capacitor C1*a*, the storage capacitor of circuit SC4*a*. Pulse 36 is also applied to a corresponding storage circuit of a preceding group of four storage cells (not shown) and therefore introduces the data bit "1" shown at the left of FIG. 2 to the storage capacitor of storage circuit SC4 in the form of a positive charge on the storage capacitor. Pulse 38, from clocking pulse source $\phi 2$, turns on the second FET in storage circuit SC2 and charges or discharges capacitor C1, depending on the data present at the gate of the first FET in storage circuit SC2. Pulse 38 therefore creates a vacancy on the storage capacitor of storage circuit SC2 by transferring the information on its storage capacitor in inverted form to storage capacitor C1 of storage circuit SC1.

At this point, pulse source P1 provides a pulse 40 to supply energy through storage circuit SC1 for storage capacitor C1*a* associated with storage circuit SC4*a* and the corresponding storage capacitor of storage circuits SC3 through storage circuit SC4. Pulse 42 from clocking pulse source $\phi 3$ now creates a vacancy at the storage capacitor of storage circuit SC3 by transferring in inverted form the information stored there to the storage capacitor of storage circuit SC2.

At this point, the application of pulse 44 from clocking pulse source $\phi 4$ transfers the data bit "1" in inverted form (i.e., absence of charge) from the storage capacitor of circuit SC4 to the storage capacitor of circuit SC3, and simultaneously creates a vacancy at the storage capacitor of circuit SC4. It should be recognized that a vacancy is created in the same way at the storage capacitor C1*a* of circuit SC4*a*, which represents the initial storage circuit of a succeeding group of four storage circuits. The source of the data "1" is a preceding group of storage circuits, with the second FET of its last storage circuit connected to the source $\phi 1$.

The above sequence is repeated with pulses 46, 48, 50, 52, 54 and 56, except that the data bit "1" is transferred, once again in inverted form (and hence back to its original positive charge) from the storage capacitor of storage circuit SC3 to storage capacitor of storage circuit SC2 by pulse 54 from source $\phi 3$. In the sequence of pulses 58, 60, 62, 64, 66 and 68, the data bit "1" is transferred from the storage capacitor of storage circuit SC2 to the storage capacitor C1 of storage circuit SC1 by pulse 62 from source $\phi 2$. The data bit "1" is stored on storage capacitor C1 as an absence of charge. Pulse 64 from source P1 is transmitted through FET T1 to capacitor C0. Capacitive coupling through capacitor C1 turns on FET T1 to transmit pulse 64, even though no charge is present at gate G1 of FET T1 from the information stored on capacitor C1. At the conclusion of pulse 64, FET T1 turns off and capacitor C1 returns to its data storage condition, i.e., absence of charge. Pulse 64 has been used to charge capacitor C0. In the succeeding group of pulses 70, 72, 74, 76, 78 and 80, pulse 72 from source $\phi 1$ turns on FET T2 and allows the charge from pulse 64 temporarily stored on capacitor C0 to charge storage capacitor C1*a* of storage circuit SC4*a*. Additional charge for storage capacitor C1*a* is provided by pulse 72 from source $\phi 1$ through capacitor C0 by capacitive coupling. At the termination of pulse 72 from source $\phi 1$, FET T2 turns off and storage capacitor C1*a* of storage circuit SC4*a* is isolated by FET T2 from the remainder of storage circuit SC1. Transfer of the data bit "1" through the four storage circuits SC4-SC1 to storage circuit SC4*a* of a succeeding group of four storage circuits has been completed.

In transferring information, each of the storage circuits SC4 to SC4*a*, each consisting of a circuit as in FIG. 1, operate as inverters. Thus, the data bit "1" stored as a positive charge at the storage capacitor of storage circuit SC4 becomes no charge at the storage capacitor of circuit SC3, a positive charge again at the storage capacitor of storage circuit SC2, no charge again at the storage capacitor C1 of storage circuit SC1, and a positive charge at the storage capacitor C1a of storage circuit SC4*a* of the succeeding group of four storage cells.

The staggered clocking pulse concept means that, with four clocking pulses as shown, only one storage circuit vacant of desired information need be provided for each three storage circuits containing desired information. Conventional shift registers require a storage circuit vacant of desired information for each storage circuit containing desired information, since all information is shifted at once by simultaneous clocking pulses.

It can be seen from FIG. 3 charging clocking pulses 34, 46, 58 and 70 from source P2 coincide with clocking pulses 36, 48, 60 and 72 from source $\phi 1$. These pulses can therefore be provided from the same source. Charging pulses 40, 52, 64 and 76 from source P1 coincide with clocking pulses 42, 54, 66 and 78 from source $\phi 3$. These pulses can also be provided from the same source. This means that it is only necessary to provide the four clocking pulse sources $\phi 1$, $\phi 2$, $\phi 3$ and $\phi 4$ in a shift register, then provide suitable interconnections to allow sources $\phi 1$ and $\phi 3$ to serve as clocking pulse sources P2 and P1, respectively.

Figure 4A:
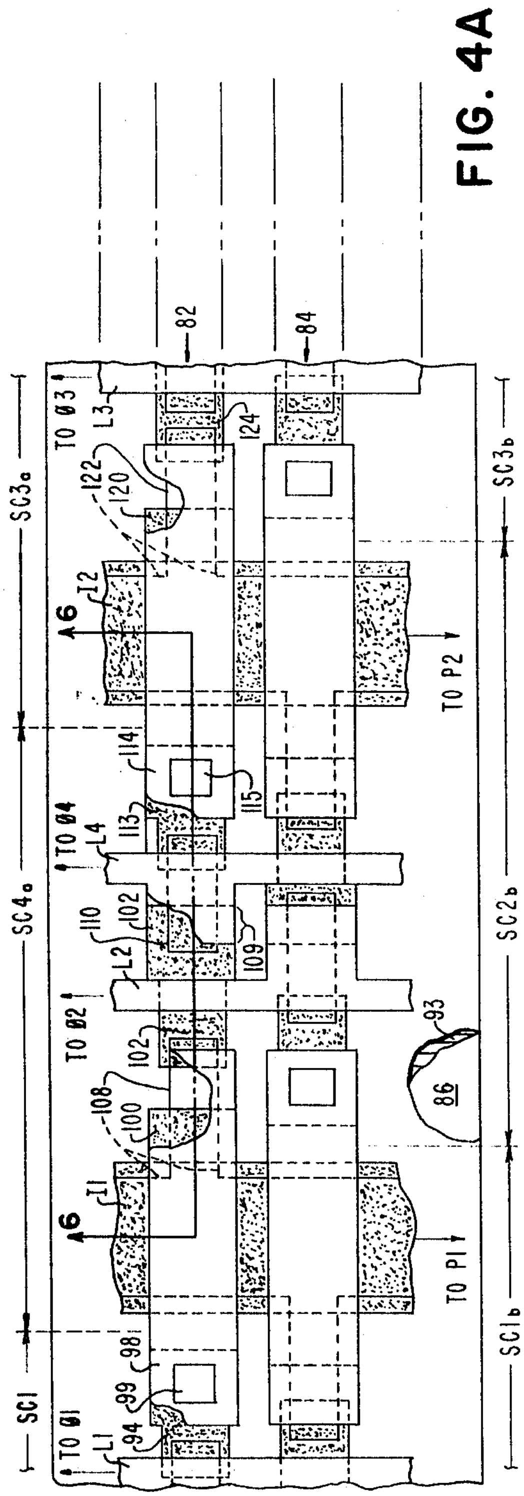
FIGS. 4A and 4B are a top view of a portion of a shift register in integrated circuit form in accordance with the invention, with partial cutaways to show detail.
Figure 4B:
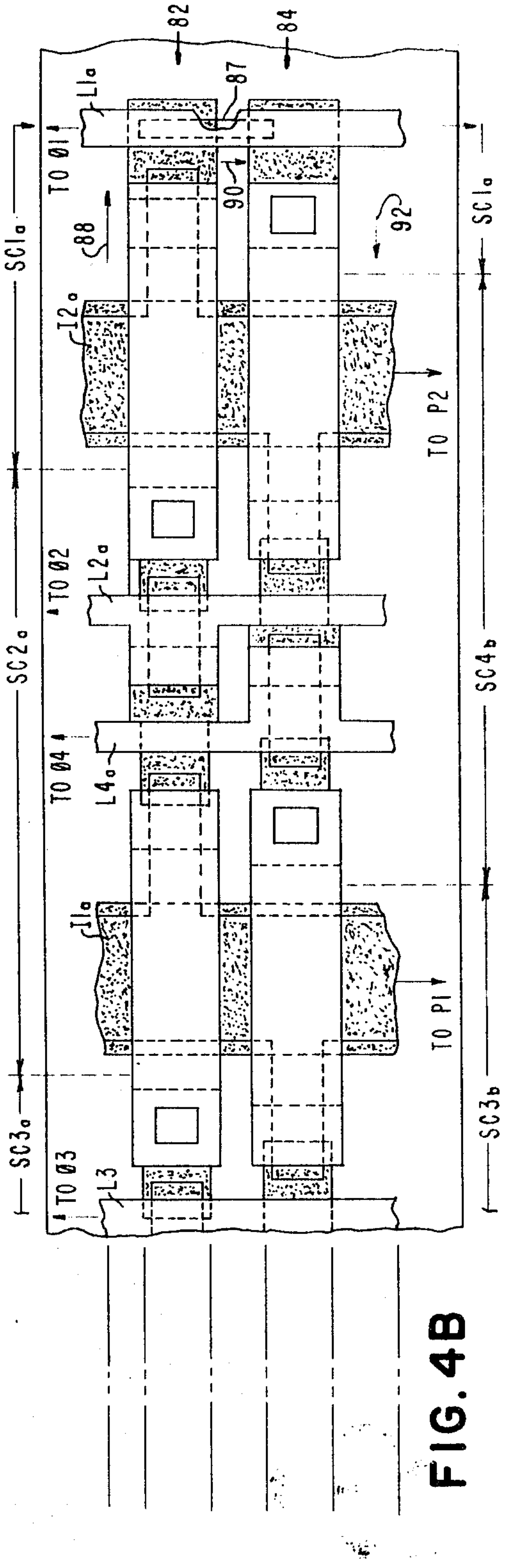

FIGS. 4A, 4B, 5A, 5B and 6 depict a portion of an integrated circuit shift register embodying the invention, together with a circuit schematic of the integrated circuit shown. FIGS. 4A and 4B show two rows 82 and 84 of a shift register on substrate 86 and electrically connected by transistor T2*d* including thin oxide region 87 to allow data flow in the register in the manner shown by arrows 88, 90 and 92. In an actual integrated circuit shift register, additional rows would be present above and below rows 82 and 84, spaced from rows 82 and 84 a distance equal to the separation between rows 82 and 84. Such additional rows have been omitted for clarity. From left to right, aluminum phase lines L1, L2, L4, L3, L4*a*, L2*a*, and L1*a* form generally parallel columns and overlie portions of the diffusions forming the circuit elements in the shift register. Oxide insulation layer 93 separates the aluminum phase lines and all other circuit metallurgy from semiconductor substrate 86, except where electrical contact to the substrate 86 is desired. These phase lines L1 to L1*a* are connected to corresponding clocking pulse sources $\phi 1$ to $\phi 4$ to provide the required clocking pulses to the FET's in the shift register. Diffused interconnection lines I1, I2, I1*a*, and I2*a* are parallel to phase lines L1 to L1*a*, are connected to corresponding pulse sources P1 and P2, and serve to provide pulses to the first FET of each storage circuit for charging the storage capacitances of each succeeding storage circuit. The integrated circuit shift register shown forms a portion of storage circuit SC1 through a portion of storage circuit SC1*b*.

Figure 5A:
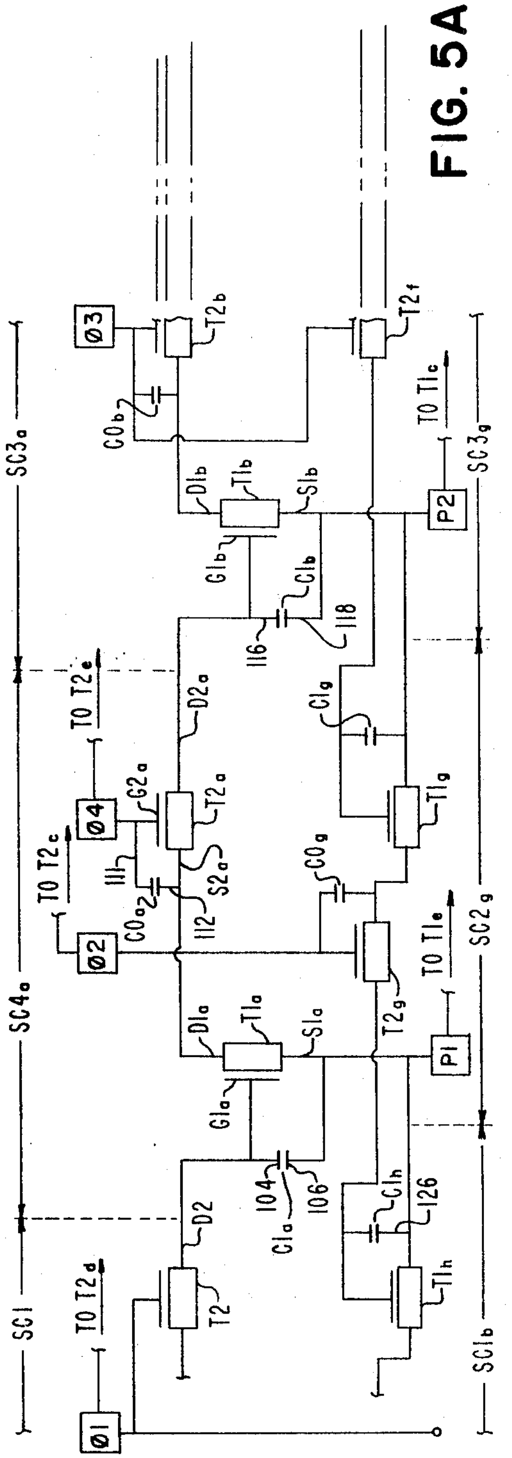
FIGS. 5A and 5B are a corresponding schematic drawing of the integrated circuit in FIGS. 4A and 4B.

Beginning at storage circuit SC1, diffusion 94 in substrate 86 forms drain electrode D2 of FET T2 shown in FIG. 5A. Since the embodiment shown uses N-channel FET's the substrate 86 is of P-type conductivity, and the diffusion 94, as well as the remainder of the diffusions in the substrate 86, are N-type. Metallization pattern 98 is connected to diffusion 94 at contact 99 to connect drain D2 of FET T2 to gate G1*a* of transistor T1*a*, which transistor is formed by extension 100 of the diffused interconnection line I1 and diffusion 102 in substrate 86. Storage capacitor C1*a* of circuit SC4*a* has its first electrode 104 formed by the metallic interconnection line 98, and its second electrode 106 formed by the diffused interconnection line I1. Thin oxide region 108 (best seen in FIG. 6) serves both as the insulating layer between the electrodes 104 and 106 of capacitor C1*a*, and as the insulating layer for gate G1*a* of FET T1*a*. Thin oxide region 108, and other thin oxide regions in the circuit, have thicknesses of about 500 angstroms. The remainder of oxide insulation layer 93 has a thickness of, e.g., about 5,000 angstroms. The greater width of metallization pattern 98 and diffused interconnection line I1 compared to metallic phase line L4 serves to enhance the capacitance of capacitor C1*a*. Source S1*a* of transistor T1*a*, formed by extension 100 of diffused interconnection I1, receives pulses from source P1 for charging storage capacitor C1*b* through FET T1*a*. Drain D1*a* of FET T1*a* is formed by diffusion 102, which also forms source S2*a* of transistor T2*a*. Capacitor C0*a*, connected between gate G2*a* and source S2*a* of FET T2*a*, is formed by a portion 109 of the aluminum phase line L4 overlying diffusion 102 and thin oxide region 110. Electrode 111 of capacitor C0*a* comprises this portion of phase line L4. Electrode 112 of capacitor C0*a* comprises the diffusion 102 forming source S2*a* of FET T2*a*. Diffusion 113 forming drain D2*a* of transistor T2*a* is connected to aluminum interconnection 114 at the end by contact 115. The other end of interconnection 114 forms gate G1*b* of transistor T1*b* and electrode 116 of capacitor C1*b*. Electrode 118 of capacitor C1*b* is formed by diffused interconnection pattern I2. Extension 120 of diffused interconnection I2 forms the source S1*b* of transistor T1*b*. Thin oxide region 122 insulates electrode 116 from electrode 118 of capacitor C1*b*. Drain D1*b* of transistor T1*b* is formed by diffusion 124.

Figure 5B:
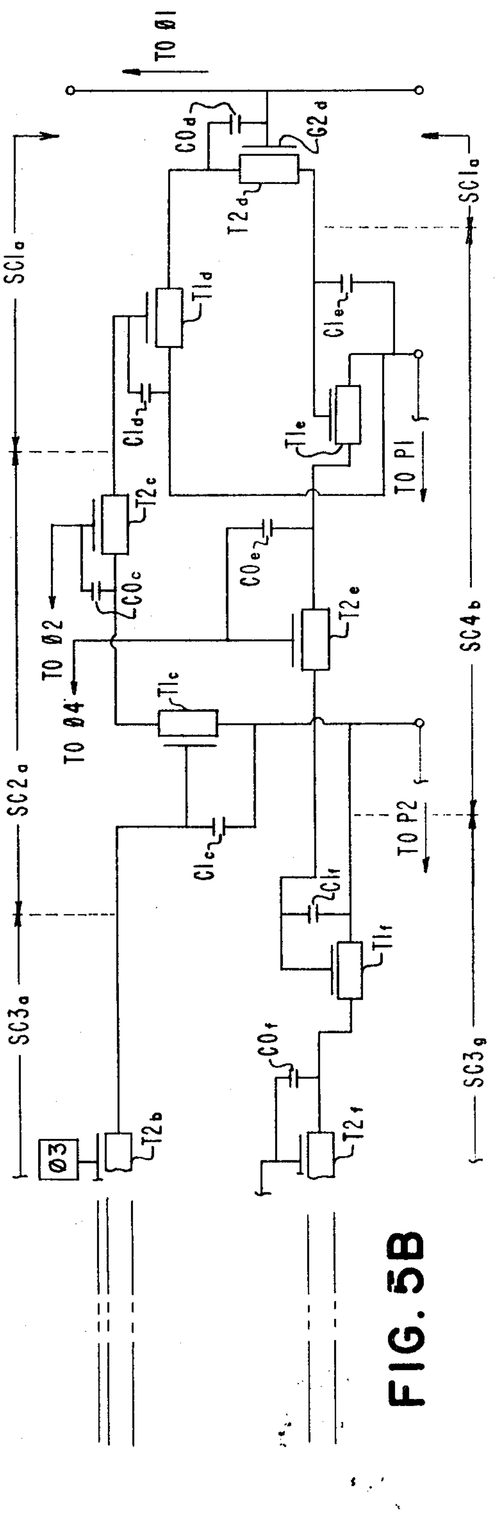

In a similar manner the remaining diffusions, metallization, and thin oxide regions in substrate 86 form the remaining FET's and capacitors shown in FIGS. 5A and 5B. The remaining FET's and capacitors for the circuit shown have been labeled in FIGS. 5A and 5B as transistors T1*c*-T1*h*, T2*b*-T2*g*, C1*c*-C1*h*, and C0*b*-C0*g*. The diffusions, metallizations, and thin oxide regions for these elements are identical to those already described, with the exception of thin oxide region 87, forming the insulation layer of gate G2d of FET T2d, which serves to connect rows 82 and 84 of the shift register.

It should be noted that this arrangement of at least several storage circuits in each interconnected row means that two phase lines must cross only every other storage circuit. Because of the timing of pulses in them, phase lines L1 and L3 can simultaneously provide clocking pulses to a second FET of a storage circuit in row 82 and to a corresponding second FET of a storage circuit in row 84 beneath the second FET of the storage circuit in row 82. For example, phase line L3 provides simultaneous clocking pulses to FET T2*b* in row 82 and FET T2*f* in row 84. Most efficient use is also made of diffused interconnection lines I1, I2, I1*a*, and I2*a*. Interconnection line I1 forms the electrode 106 of capacitor C1*a* in row 82, and a corresponding electrode 126 of capacitor C1*h* in row 84 directly under electrode 106.

The integrated circuit shown may be formed by processes known in the art. For example, the process for making FET-integrated circuits disclosed in commonly assigned Couture et al., Application Ser. No. 791,214, filed Jan. 15, 1969, the disclosure of which is incorporated herein by reference, may be employed.

Figure 6:
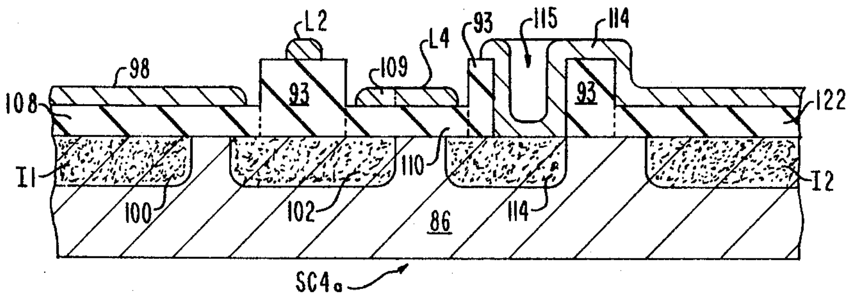
FIG. 6 is a cross section of the integrated circuit in FIG. 4A, taken along the line 6—6.

With an integrated circuit shift register as shown in FIGS. 4A and 4B, and FIG. 6, the pulses shown in FIG. 3 are of about 8 volts amplitude at the storage circuits. This is about the highest voltage that can be delivered to the storage circuits of the integrated circuit shift register without degrading performance of the shift register due to unwanted signals from parasitic thick oxide FET's, formed where a thick oxide region 93 with a metallic interconnection on its surface overlies a channel between two diffusions.

By providing a pulse through the first FET T1 of storage circuit SC1 to charge capacitor C0 for the purpose of providing energy to storage capacitor C1*a* of storage circuit SC4*a*, it is possible to reduce capacitor C0 to about 0.2 picofarads. At the same time, capacitor C1 must be enhanced to a value of about the same level. By comparison, the parasitic capacitance C*p* in FIG. 1 has a value of about 0.03 picofarads.

With the integrated circuit layout of FIGS. 4A and 4B, it takes substantially less effective integrated circuit chip area to enhance capacitor C1 than to enhance capacitor C0. The result of reducing capacitor C0 to 0.2 picofarads and increasing capacitor C1 to the same value means that, with pulses of 8 volts and the integrated circuit layout of FIGS. 4A and 4B, each storage circuit requires an area of only 4 square mils, a substantial reduction. With this size and 8 volt pulses, excellent performance can be obtained in a shift register containing over 100 storage cells of the type shown in FIG. 1. The output of such a shift register can be connected to its input and the information stored therein kept circulating for long periods of time until it is needed, with low power consumption.

Figure 7:
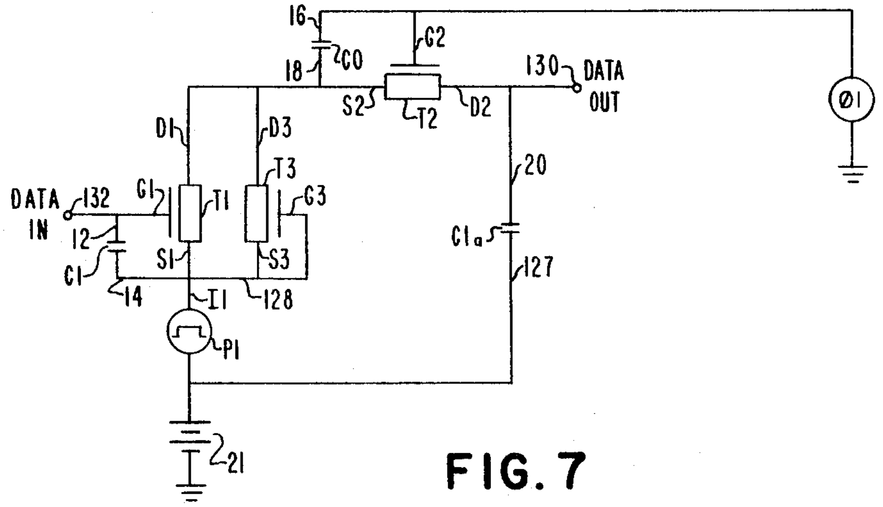
FIG. 7 is a schematic diagram of another embodiment of the invention, which may be used in combination with the embodiment of FIG. 1 to give a further improved shift register.

FIG. 7 shows another embodiment of the invention which may be used with the embodiment of FIG. 1 to give an increased output signal. As in FIG. 1, the circuit has FET's T1 and T2, series connected by their current flow electrodes D1 and S2. Capacitor C1 is connected between current flow electrode S1 and gate electrode G1 of FET T1 by its electrodes 12 and 14. Capacitor C0 is connected between current flow electrode S2 and gate electrode G2 of FET T2 by its electrodes 16 and 18. Capacitor C1*a* is connected to current flow electrode D2 of FET T2 and to DC source 21 by its electrodes 20 and 127, respectively. FET T3 is added to the circuit across FET T1 to give an enhanced charging signal for storage capacitor C1*a*. Current flow electrode S3 and gate electrode G3 of FET T3 have a common connection to current flow electrode S1 of FET T1 and pulse source P1 by lines 128 and 11. Current flow electrode D3 of FET T3 is connected to current flow electrode D1 of FET T1.

In this configuration, FET T3 acts as an FET diode. Thus, FET T3 could be replaced by another type of diode, e.g., a Schottky diode. A portion of the charging pulse for storage capacitor C1*a* continues to pass through FET T1 by virtue of the capacitive connection C1 between its current flow electrode S1 and gate electrode G1. The remainder of the charging pulse from source P1 passes through FET T3. If it is desired to pass all of the charging pulse for storage capacitor C1*a* through FET T3, the electrode 14 of capacitor C1 may be grounded, rather than connected to source P1. This approach for the output storage cell of a shift register is often advantageous from a noise reduction standpoint. Both components of the pulse charge capacitor C0 temporarily until the clocking pulse from source $\phi 1$ turns on FET T2, thus allowing storage capacitor C1*a* to be charged if data in is no charge or not to be charged if data in is a positive charge.

When used as the data output cell of a shift register, information is read out of the register at the data out terminal 130. The data in terminal 132 is connected to the second FET of the previous storage circuit in the shift register.

The embodiment of FIG. 7 may also be used as the initial or data input storage circuit of a shift register. When so employed, the data in terminal 132 is connected to suitable input circuitry (not shown) for the shift register. When used as the initial data input storage circuit of the shift register, the capacitor C1 may be omitted, and all of the charging pulse for storage capacitor C1*a* supplied through FET T3, if desired. The data out terminal 130 of the circuit is connected to the gate of the first FET of a succeeding storage circuit, and electrode 127 of storage capacitor C1*a* is connected to a current flow electrode of the same FET, in a manner analogous to capacitor C1.

The use of the circuit in FIG. 7 as the initial data input storage circuit and the data output storage circuit of the shift register means that a substantially enhanced charging pulse may be supplied at the input end of the register, and a substantially enhanced output signal may be obtained at the end of the register, both without a substantial overall increased use of integrated circuit chip area. It should be recognized that the provision of FET T3 as in FIG. 7 results in a larger circuit in integrated form than that of FIG. 1, due to the extra interconnection lines required, and its use as the internal storage cells of a shift register would require somewhat more area than the embodiment of FIG. 1.

The above description has been in terms of individual storage circuits or several storage circuits forming a portion of a complete shift register. An actual complete shift register would contain over 100 of the circuits of type shown in FIG. 1. Due to the simplified and smaller storage circuit, a plurality of shift registers each containing over 100 storage circuits may be contained in a single integrated circuit chip measuring only about 0.1 inch by 0.1 inch and containing a total of about 2,800 of the circuits shown in FIG. 1, 8 clocking pulse phase gates, 12 input-output circuits for the shift registers, and connection pads for communication with the outside world.

It should now be apparent that a storage circuit and shift register containing the storage circuit suitable for attaining the stated objects of the invention has been provided. The number of active elements required in a shift register storage circuit has been reduced, while at the same time reducing the area required for a shift register storage circuit. This result is obtained by providing a storage circuit in which both data input and a pulse for storage means in the circuit are provided through the same FET. The features of a simplified storage circuit and a smaller storage circuit make shift registers utilizing the invention of particular value in large-capacity memory applications. The invention makes realizeable a large-capacity memory capable of storing about 10 million bits of information at a cost that is low enough for large capacity memory applications, with an average access time of about 50 microseconds. Such large memory capacity has hitherto been realizable only with great difficulty in static magnetic memories or with electromechanically accessed memories, such as disk files, which are far slower and less reliable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit comprising:

A. first and second field effect transistors each having two current flow electrodes and a gate electrode, the two transistors being connected with their current flow electrodes in series and having a given threshold value, B. storage means selectively having a given charge below said threshold value connected to the gate electrode of said first transistor, C. a data input means coupled to said storage means, D. means for supplying a pulse to the current flow electrode of said first transistor remote from said second transistor and for coupling a sufficient amount of alternating current energy from said pulse through said storage means to the gate electrode of said first transistor when the charge on said storage means is below the threshold value of said first transistor to exceed the threshold value of said first transistor momentarily, thus to turn on said first transistor for supplying the remainder of energy from said pulse through said first transistor to the other current flow electrode independent of the state of said storage means, E. means utilizing energy from the pulse and coupled to the current flow electrode of said second transistor remote from said first transistor, and F. a clocking pulse source coupled to turn on said second transistor.

2. A shift register as in claim 1 in which the circuits are arranged in a plurality of groups, the clocking pulse sources of the storage circuits in said group providing together a series of staggered clocking pulses, the number of storage circuits in each said group corresponding to the number of different clocking pulses.

3. A shift register as in claim 2 in which data flow through said shift register is in a given direction and the staggered clocking pulses are applied sequentially to the circuits in said group in reverse order to the given direction.

4. The circuit of claim 1 in which said storage means is a capacitor.

5. The circuit of claim 5 in which said transistors are insulated gate field effect transistors.

6. The circuit of claim 6 in which the gate of an insulated gate field effect transistor is one of the electrodes of said capacitor, and a semiconductor substrate in which said transistor is formed is the other electrode of said capacitor.

7. A storage circuit comprising:

A. a first field effect transistor having two current flow electrodes and a gate electrode, B. a capacitor connected between one of the current flow electrodes and the gate electrode of said first field effect transistor, C. a data input to the gate of said first field effect transistor, D. means for supplying a pulse of sufficient magnitude to allow coupling of enough energy from said pulse through said capacitor to the gate of said transistor to exceed its threshold in the absence of charge on said capacitor, thereby to supply the remaining energy of said pulse through said first transistor to the other current flow electrode independent of the state of said storage means, connected to the current flow electrode of said first field effect transistor to which said capacitor is connected, E. a second field effect transistor having two current flow electrodes and a gate electrode, one of said current flow electrodes being connected to the other current flow electrode of said first field effect transistor, F. a capacitor connected to the other current flow electrode of said second field effect transistor, and G. a clocking pulse source connected to the gate of said second field effect transistor.

8. A shift register as in claim 8 in which said capacitor connected between one electrode and the gate of said first field effect transistor is also the capacitor connected to the other electrode of the second field effect transistor of a previous storage circuit in said shift register, and said capacitor connected to the other electrode of said second field effect transistor is also the capacitor connected between one of the current flow electrodes and the gate electrode of the first field effect transistor of a subsequent storage circuit in said shift register.

9. A shift register comprising:

A. an interconnected plurality of storage circuits comprising:

1. a first field effect transistor having two current flow electrodes and a gate electrode,
2. a capacitor connected between one of the current flow electrodes and the gate electrode of said first field effect transistor,
3. a data input to the gate of said first field effect transistor,
4. a source of pulses connected to the current flow electrode of said first field effect transistor to which said capacitor is connected,
5. a second field effect transistor having two current flow electrodes and a gate electrode, one of said current flow electrodes being connected to the other current flow electrode of said first field effect transistor,
6. a capacitor connected to the other current flow electrode of said second field effect transistor, and
7. a clocking pulse source connected to the gate of said second field effect transistor;

B. a data input storage circuit at the beginning of said shift register; and

C. a data output storage circuit at the end of said shift register;

said data input and data output storage circuits each comprising:

1. first and second field effect transistors each having two current flow electrodes and a gate electrode and being series connected by their current flow electrodes,
2. a third field effect transistor having two current flow electrodes and a gate electrode, a first one of the current flow electrodes and the gate electrode of said third field effect transistor being in a common connection to the current flow electrode of said first field effect transistor remote from said second field effect transistor, the other current flow electrode of said third field effect transistor being connected to the other current flow electrode of said first field effect transistor,
3. a pulse source connected to the first current flow electrode of said third field effect transistor,
4. a capacitor connected to the current flow electrode of the second field effect transistor remote from said first field effect transistor, and
5. a clocking pulse source connected to the gate of the second field effect transistor.

10. A storage circuit as in claim 7 additionally comprising:

A. a capacitor connected between the gate and the current flow electrode of said second field effect transistor which is connected to said first field effect transistor.

11. A storage circuit comprising:

A. first and second field effect transistors, each having two current flow electrodes and a gate electrode, the two transistors being connected with their current flow electrodes in series, B. a first capacitor connected between the gate of said second field effect transistor and the current flow electrode of said second field effect transistor which is connected to a current flow electrode of said first field effect transistor, C. a clocking pulse source connected to the gate of said second field effect transistor, D. a data input to the gate of the first field effect transistor, E. a second capacitor connected between the gate of said first field effect transistor and its current flow electrode remote from said second field effect transistor, and F. means for applying a charge to said first capacitor prior to a pulse from said clocking pulse source and through said first field effect transistor by applying a sufficient pulse to the current flow electrode of said first field effect transistor remote from said second field effect transistor to couple enough energy through said second capacitor to exceed the threshold of said first field effect transistor in the absence of charge on said second capacitor, thus to supply the remaining energy of said pulse to the other current flow electrode independent of the state of said second capacitor.

12. The storage circuit of claim 11 in which said means for applying a charge to said capacitor is another capacitor connected between the current flow electrode of said first field effect transistor remote from said second field effect transistor and the gate of said first field effect transistor, and a source of pulses connected to the current flow electrode of said first field effect transistor to which said another capacitor is connected.

13. A storage circuit comprising:

A. first and second serially connected field effect transistors,

B. data storage means controlling said first transistor,

C. means for applying a control pulse to said second transistor, and

D. pulse means, independent of the control pulse from said means for applying a control pulse, for supplying energy through said first and second transistor for utilization at an output depending upon the state of said data storage means, said energy being supplied through said first transistor by application of a sufficient pulse to its current flow electrode remote from said second field effect transistor to couple enough alternating current energy through said data storage means to exceed the threshold voltage of said first transistor momentarily in the absence of other signal in excess of the threshold voltage of the first transistor applied to it, thereby to supply the remaining energy of said pulse through said first transistor to its other current flow electrode independent of the state of said data storage means.

14. A storage circuit as in claim 13 in which said data storage means is a first capacitor.

15. A storage circuit as in claim 14 having a second capacitor connected to the output and wherein the energy supplied by said pulse means for supplying energy is used to charge said second capacitor.

16 A storage circuit as in claim 14 in which said first capacitor is connected between a gate electrode and one current flow electrode of said first field effect transistor and comprises, together with a charging pulse source coupled to the same current flow electrode of said first field effect transistor, said pulse means for supplying energy.

17. A shift register comprising an interconnected plurality of the circuits of claim 13 and additionally comprising initial and terminating storage circuits having:

A. first and second series connected field effect transistors,

B. storage means controlling said first field effect transistor,

C. a clocking pulse source coupled to turn on said second field effect transistor, D. a third field effect transistor with a common connection between a gate electrode and one current flow electrode, another current flow electrode of said third field effect transistor being connected to a current flow electrode of said second field effect transistor proximate said first field effect transistor, and E. a pulse source coupled to the current flow electrode of said third field effect transistor remote from said second field effect transistor.

18. A shift register as in claim 9 in which said terminating storage circuit is coupled to said initial storage circuit to allow recirculation of information in said shift register.

* * * * *